(12) United States Patent
Roth-Mandutz et al.

(10) Patent No.: US 12,483,857 B2
(45) Date of Patent: Nov. 25, 2025

(54) PROXIMITY AWARENESS IN SIDELINK COMMUNICATIONS

(71) Applicant: Fraunhofer-Gesellschaft zur Förderung der angewandten Forschung e.V., Munich (DE)

(72) Inventors: Elke Roth-Mandutz, Erlangen (DE); Khaled Shawky Hassan Hussein, Erlangen (DE); Shubhangi Bhadauria, Erlangen (DE); Martin Leyh, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 857 days.

(21) Appl. No.: 17/240,722

(22) Filed: Apr. 26, 2021

(65) Prior Publication Data
US 2021/0250118 A1    Aug. 12, 2021

Related U.S. Application Data

(63) Continuation of application No. PCT/EP2019/072399, filed on Aug. 21, 2019.

(30) Foreign Application Priority Data

Oct. 31, 2018    (EP) .................................... 18203882

(51) Int. Cl.
*H04W 4/02*    (2018.01)
*H04L 1/00*    (2006.01)
(Continued)

(52) U.S. Cl.
CPC ........... *H04W 4/023* (2013.01); *H04L 1/0017* (2013.01); *H04W 72/56* (2023.01); *H04W 76/14* (2018.02);
(Continued)

(58) Field of Classification Search
CPC ... H04L 1/0017; H04L 41/5019; H04L 67/61; H04L 1/0003; H04L 1/0009; H04L 67/12;
(Continued)

(56) References Cited

U.S. PATENT DOCUMENTS

2016/0037549 A1    2/2016  Seo et al.
2016/0135143 A1    5/2016  Won et al.
(Continued)

FOREIGN PATENT DOCUMENTS

CN    104284436 A    1/2015
CN    104335654 A    2/2015
(Continued)

OTHER PUBLICATIONS

"Huawei et al: "QoS Support for V2X transmission"", 3GPP Draft; R2 161101 QOS and Priority Handling for PC5-Based V2V, 3rd Generation Partnership Project (3GPP), vol. RAN WG2, No. Malta; Feb. 15, 2016-Feb. 19, 2016, Feb. 14, 2016, XP051055090, 2016.
(Continued)

*Primary Examiner* — Ivan O Latorre
(74) *Attorney, Agent, or Firm* — Perkins Coie LLP; Michael A. Glenn

(57) ABSTRACT

An apparatus for a wireless communication system is configured to be connected to at least one UE via a sidelink for a sidelink communication with the one or more UEs. The apparatus is configured to obtain distance information representing a certain communication range or a certain distance around the apparatus, perform a communication with one or more UEs at or within the certain communication range or the certain distance at a first priority to meet a predefined QoS, and perform a communication with one or more UEs outside the certain communication range or the certain distance at a second priority, the first priority being higher than the second priority to meet a predefined QoS.

8 Claims, 10 Drawing Sheets

(51) Int. Cl.
*H04L 67/12* (2022.01)
*H04W 4/46* (2018.01)
*H04W 72/56* (2023.01)
*H04W 76/14* (2018.01)
*G08G 1/00* (2006.01)

(52) U.S. Cl.
CPC ............... *G08G 1/22* (2013.01); *H04L 67/12* (2013.01); *H04W 4/46* (2018.02)

(58) Field of Classification Search
CPC ..... H04W 4/023; H04W 72/56; H04W 76/14; H04W 4/46; H04W 4/40; G08G 1/22
See application file for complete search history.

(56) References Cited

U.S. PATENT DOCUMENTS

| | | | |
|---|---|---|---|
| 2016/0269153 | A1 | 9/2016 | Zhang et al. |
| 2018/0138965 | A1 | 5/2018 | Martin |
| 2018/0367261 | A1* | 12/2018 | Gonzalves Serrano ................. H04L 1/1812 |
| 2019/0191452 | A1 | 6/2019 | Pelletier et al. |
| 2020/0162864 | A1* | 5/2020 | Lee ............ H04L 1/1671 |
| 2020/0305176 | A1* | 9/2020 | Hu ............ H04B 7/0626 |

FOREIGN PATENT DOCUMENTS

| | | |
|---|---|---|
| CN | 104581836 A | 4/2015 |
| CN | 105075158 A | 11/2015 |
| CN | 107534482 A | 1/2018 |
| EP | 3273634 A1 | 1/2018 |
| WO | 2012137041 A1 | 10/2012 |
| WO | 2016144574 A1 | 9/2016 |
| WO | 2016197813 A1 | 12/2016 |
| WO | 2017069445 A1 | 4/2017 |
| WO | 2017103662 A1 | 6/2017 |
| WO | 2017150956 A1 | 9/2017 |
| WO | 2017222433 A1 | 12/2017 |

OTHER PUBLICATIONS

"Intel Corporation: "Design options to support priority for V2V communication"", 3GPP Draft; RI-167693 Intel—V2V Priority, 3rd Generation Partnership Project (3GPP), Mobile Competence Centre; vol. RAN WGI, No. Gothenburg, Sweden; Aug. 21, 2016, XP051126031, 2016.
"Intel Corporation: "On QoS Management for NR V2X Communication"", 3GPP Draft; R1-1808701 Intel—EV2X QOS, 3rd Generation Partnership Project T3GPP), vol. RAN WGI, No. Gothenburg, Sweden; Aug. 20, 2018-Aug. 24, 2018, Aug. 11, 2018, XP051516076, 2018.
"Qualcomm Incorporated: 11 Discussion onGroupcast for NR v2x 11 3GPP Draft", R2-1814929—Discussion on NR V2X Groupcast, 3rd Generation Partnership Project (3GPP), Mobile Competence Centre; vol. RAN WG2, No. Chengdu, China; XP051524307, 2018.
"TR 22.886 "Study on enhancement of 3GPP support for 5G V2X services"", V 16.0.0; Jun. 23, 2018, 2018.
"TS 23.303 "Proximity-based services (ProSe); Stage 2"", V 15.1.0; Jun. 19, 2018, 2018.
"ZTE: "Discussion on QoS management for NR V2X"", 3GPP Draft; R2-1814175 Discussion on QOS Management for NR V2X, 3rd Generation Partnership Project (3GPP), vol. RAN WG2, No. Chengdu, China; Oct. 8, 2018-Oct. 12, 2018, Sep. 28, 2018, XP051523631, 2018.
3GPP TR 23.786 Study on architecture enhancements for the Evolved Packet System (EPS) and the 5G System (5GS) to support advanced V2X services (Release 16) V16.1.0 (Jun. 2019) (119 pages).

\* cited by examiner

PROXIMITY AWARENESS IN SIDELINK COMMUNICATIONS

CROSS-REFERENCES TO RELATED APPLICATIONS

This application is a continuation of copending International Application No. PCT/EP2019/072399, filed Aug. 21, 2019, which is incorporated herein by reference in its entirety, and additionally claims priority from European Application No. EP 18 203 882.8, filed Oct. 31, 2018, which is incorporated herein by reference in its entirety.

The present invention relates to the field of wireless communication systems or networks, more specifically to the improvements and enhancements regarding a sidelink communication among network entities, like mobile user devices or other user equipment, UE. Embodiments relate to a proximity awareness in sidelink communications, like V2X communications, with regard to a quality of service to be provided or with regard to a feedback mechanism, like the HARQ mechanism, for such sidelink communications.

BACKGROUND OF THE INVENTION

FIG. 1 is a schematic representation of an example of a terrestrial wireless network 100 including, as is shown in FIG. 1(a), a core network 102 and one or more radio access networks $RAN_1$, $RAN_2$, .... $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g. GSM, UMTS, LTE base stations.

When considering two UEs directly communicating with each other over the sidelink, e.g. using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

It is noted that the information in the above section is only for enhancing the understanding of the background of the invention and therefore it may contain information that does not form known technology that is already known to a person of ordinary skill in the art.

Starting from the known technology as described above, there may be a need for improvements or enhancements in the communications using a sidelink taking into consideration the proximity among the respective network entities communicating over the sidelink.

SUMMARY

An embodiment may have an apparatus for a wireless communication system, wherein the apparatus is configured to be connected to at least one UE via a sidelink for a sidelink communication with the one or more UEs, and the apparatus is configured to: acquire distance information representing a certain communication range or a certain distance around the apparatus, and perform a communication with one or more UEs at or within the certain communication range or the certain distance at a first priority to meet a predefined QoS, and perform a communication with one or more UEs outside the certain communication range or the certain distance at a second priority, the first priority being higher than the second priority to meet a predefined QoS.

Another embodiment may have an apparatus for a wireless communication system, wherein the apparatus is configured to be connected to at least one UE via a sidelink for a sidelink communication with the one or more UEs, and the apparatus is configured to: acquire distance information representing a certain communication range or a certain distance around the apparatus, and initiate a feedback mechanism, e.g., HARQ, for a communication with one or more UEs at or within the certain communication range or the certain distance.

Another embodiment may have a wireless communication system including: one or more base stations, and a plurality of user devices, UEs, at least some of the UEs including an inventive apparatus or an apparatus for a wireless communication system, wherein the apparatus is configured to be connected to at least one UE via a sidelink for a sidelink communication with the one or more UEs, and the apparatus is configured to: acquire distance information representing a certain communication range or a certain distance around the apparatus, and initiate a feedback mechanism, e.g., HARQ, for a communication with one or more UEs at or within the certain communication range or the certain distance.

Another embodiment may have a method for operating an apparatus for a wireless communication system, wherein the apparatus is connected to at least one UE via a sidelink for a sidelink communication with the one or more UEs, the method having the steps of: acquiring distance information representing a certain communication range or a certain distance around the apparatus, performing a communication with one or more UEs at or within the certain communication range or the certain distance at a first priority to meet a predefined QoS, and performing a communication with one or more UEs outside the certain communication range or the certain distance at a second priority, the first priority being higher than the second priority to meet a predefined QoS.

Another embodiment may have a method for operating an apparatus for a wireless communication system, wherein the apparatus is connected to at least one UE via a sidelink for a sidelink communication with the one or more UEs, the method having the steps of: acquiring distance information representing a certain communication range or a certain distance around the apparatus, and initiating a feedback mechanism, e.g., HARQ, for a communication with one or more UEs at or within the certain communication range or the certain distance.

Another embodiment may have a non-transitory digital storage medium having a computer program stored thereon to perform the method for operating an apparatus for a wireless communication system, wherein the apparatus is connected to at least one UE via a sidelink for a sidelink communication with the one or more UEs, the method having the steps of: acquiring distance information representing a certain communication range or a certain distance around the apparatus, performing a communication with one or more UEs at or within the certain communication range or the certain distance at a first priority to meet a predefined QoS, and performing a communication with one or more UEs outside the certain communication range or the certain distance at a second priority, the first priority being higher than the second priority to meet a predefined QoS, when said computer program is run by a computer.

Another embodiment may have a non-transitory digital storage medium having a computer program stored thereon to perform the method for operating an apparatus for a wireless communication system, wherein the apparatus is connected to at least one UE via a sidelink for a sidelink communication with the one or more UEs, the method having the steps of: acquiring distance information representing a certain communication range or a certain distance around the apparatus, and initiating a feedback mechanism, e.g., HARQ, for a communication with one or more UEs at or within the certain communication range or the certain distance, when said computer program is run by a computer.

BRIEF DESCRIPTION OF THE DRAWINGS

Embodiments of the present invention will be detailed subsequently referring to the appended drawings, in which:

FIG. 6a-6b illustrates scenarios employing a flexible communication range in accordance with embodiments of the present invention, wherein FIG. 6(a) illustrates a non-coverage scenario, and FIG. 6(b) illustrates an in-coverage scenario;

DETAILED DESCRIPTION OF THE INVENTION

Figure 1A:
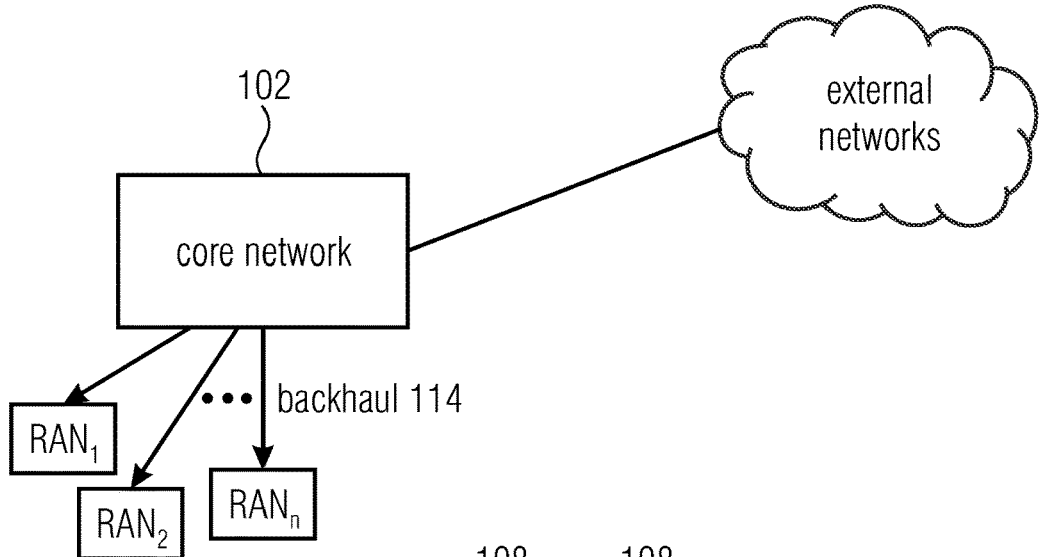
FIG. 1a-1b shows a schematic representation of an example of a wireless communication system.

Embodiments of the present invention are now described in more detail with reference to the accompanying drawings in which the same or similar elements have the same reference signs assigned.

In wireless communication systems or networks, like those described above with reference to FIG. 1, one or more users, like mobile users, may communicate with each other over a sidelink. However, conventional sidelink communications do not take into consideration or address a proximity of the respective network entities communicating with each other over the sidelink in terms of certain communication requirements or communication mechanisms to be implemented for certain services provided in the network. So far, the proximity among UEs in a wireless communication system is only tackled for discovering nearby vehicles or UEs in a sense of a discovery mechanism. In D2D scenarios, several discovery mechanisms are applied, for example a direct discovery in accordance with which UEs are able to discover other UEs in close proximity without any help of the core network. Another approach is the Evolved Packet Core EPC, level discovery in accordance with which the core network may collect information from each UE about other UEs in the base station's vicinity. The EPC, using the collected information, may notify UEs about their proximity. Another mechanism is based on a direct communication, i.e., a proximity among two UEs is assumed when two or more UEs are able to exchange data directly without passing the data to the base station. A similar approach is based on a UE-to-network relay or a UE-to-UE relay in which a UE acts as a relay either between another UE and a network or between two other UEs so that, via the relay, the respective UEs or the UE and the network may communicate. Thus, conventional approaches regarding the discovery mechanisms, either determine some kind of proximity among the respective network entities or, based on a possible communication among the entities, a proximity is assumed.

As mentioned above, a UE may be in one of three modes, namely in-coverage, partial coverage or out-of-coverage, and depending on the mode non-public safety and public safety applications or only public safety applications may take into consideration the proximity among the network entities. For example, when considering the above-mentioned discovery mechanisms including the direct discovery and the EPC-level discovery, for UEs being within the network coverage, both non-public and public safety applications may be employed, while only public safety applications may be employed when being out of coverage or in partial coverage. In case of judging the proximity on the basis of the direct communication, either directly among two UEs or via a relay, as long as the UEs are in network coverage, at least public safety applications may be employed, while only public safety applications are available when being out-of-coverage.

However, conventional approaches do not at all address the proximity with regard to certain requirements of an application for a communication to be performed among multiple network entities over the sidelink. For example conventional approaches do not take into consideration a Quality of Service, QoS, of a certain application or service that is performed using the one or more UEs over the sidelink and which involves certain latency and reliability requirements that depend on the proximity of the respective UEs. In other words, UEs that communicatie over the sidelink, i.e., are within a direct communication, may perform certain applications requiring a certain QoS only as long as the distance between these two UEs is small enough so as to provide for a desired latency, like a very low latency, and a desired reliability, like a high reliability. This may be the case for Ultra Reliable and Low Latency Communications, URLLC, services or applications. In case the distance between the UEs increases, it may be that the desired parameters associated with the quality of service for a certain service or application is no longer achieved.

Also, other network mechanisms may depend on the proximity among the UEs, and so far, conventional approaches do not take into consideration that certain network mechanisms, like feedback or retransmission mechanisms, may rely or depend on the proximity of the UEs communicating over the sidelink. When considering, for example, the Hybrid Automatic Repeat Request, HARQ, retransmission mechanism there may be certain requirements regarding the time for sending the acknowledgement/non-acknowledgement and/or for sending the retransmission needed for certain services. For example, in case the distance among the UEs employing such a mechanism is short, the respective requirements may be fulfilled. However, with an increase in the proximity such requirements may not be met anymore so that, for example, any action by the respective communication partners with regard to the feedback mechanism are wasted as the information is not available at the other partner within a certain time so as to make use of the retransmission.

Moreover, when considering V2X communications, until Rel 15 LTE V2X, all the sidelink communication is broadcast based only. In accordance with NR, further use cases, e.g., the above-described vehicular use cases, like platooning and advanced driving, use a groupcast and unicast based sidelink communication along with a basic broadcast mechanism. For example, in such advanced use cases, the communication requirements, like QoS, and/or certain communication mechanisms to be implement, may be varied and may be stringent. As discussed above, the distance among the UEs may be an issue with regard to the use of certain services or applications in such advanced use cases, for example to make sure that a certain QoS or a certain feedback mechanism is possible.

The present invention addresses the above problems, and in accordance with embodiments, a certain communication range or distance, like a minimum communication range, are defined which is utilized so as to enhance the above-mentioned discovery mechanisms in terms of allowing a UE to achieve certain communication requirements or to make useful use of certain communication mechanisms, like to maintain a certain QoS or to use a feedback mechanism. For example, dependent on the proximity of the UEs, like vehicles or cars, it may be determined to what extent a certain latency and/or a certain reliability of the communication may be achieved. In other words, embodiments of the present invention use the so-called awareness range of the UEs, like the vehicles. The QoS parameters may include, as mentioned above, the reliability and the latency, but also a priority of a communication and the communication range, in accordance with the present invention, is taken into account, i.e., the proximity is observed. Thus, embodiments provide a mechanism ensuring that a target QoS requirement is achieved by making use of a minimum requirement communication range or distance between the UEs, on the basis of which it may be determined whether the target QoS requirements may be achieved or not.

Figure 1B:
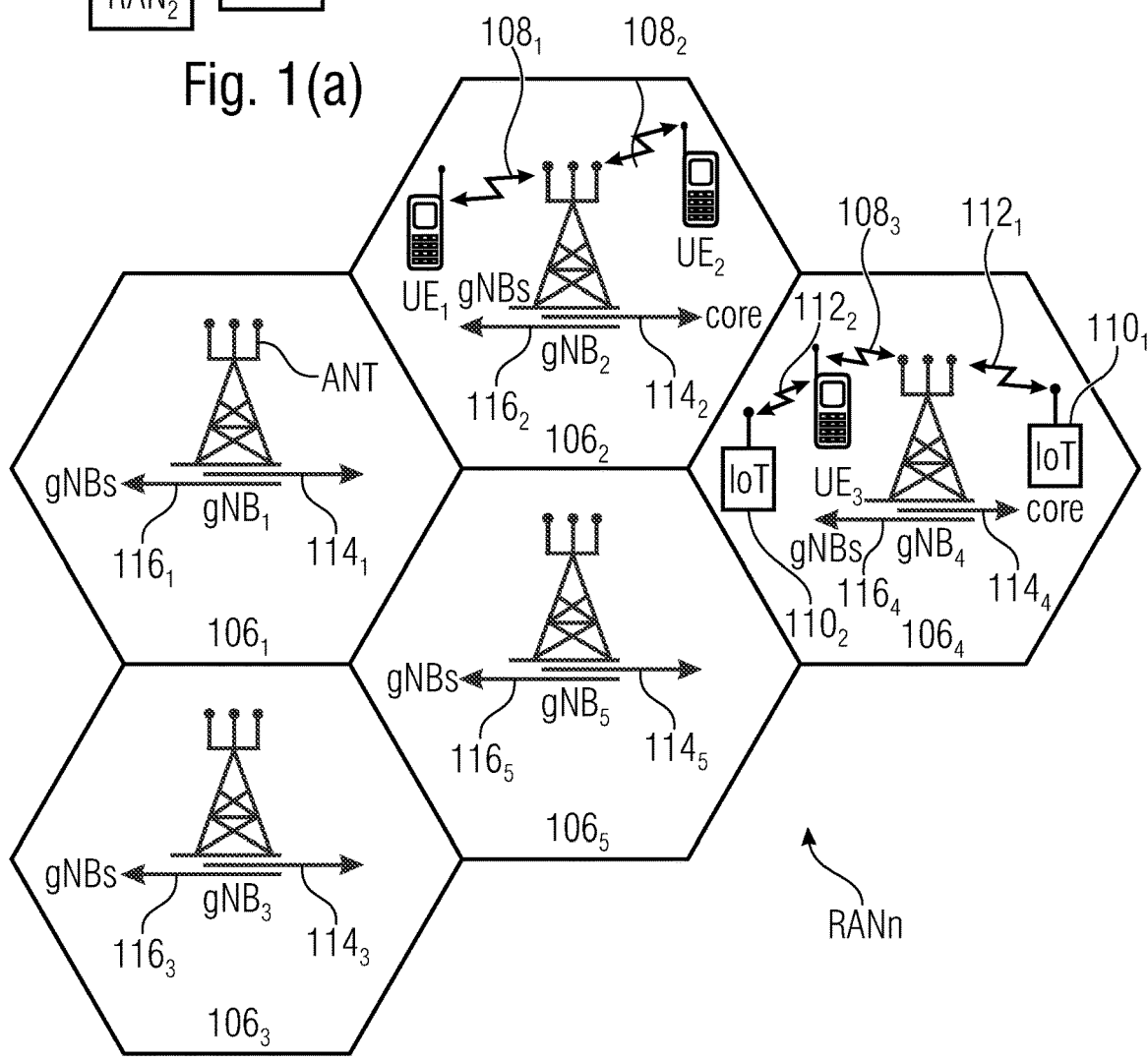
Figure 2:
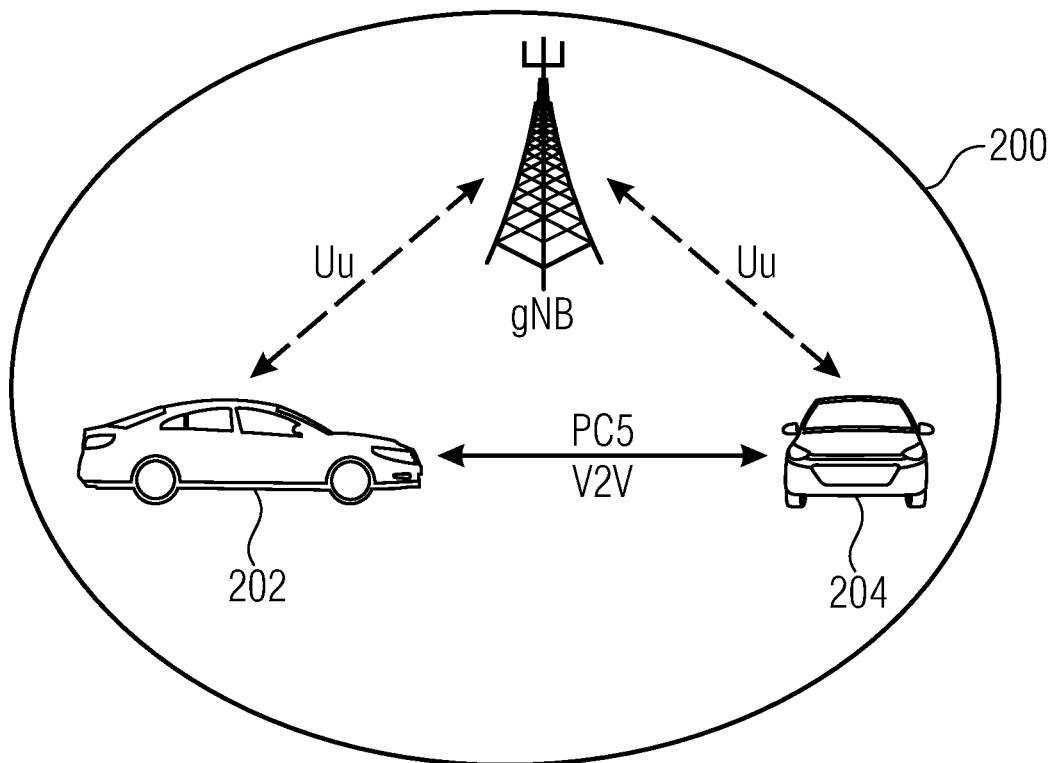
FIG. 2 is a schematic representation of an in-coverage scenario in which UEs directly communicating with each other are connected to a base station.
Figure 3:
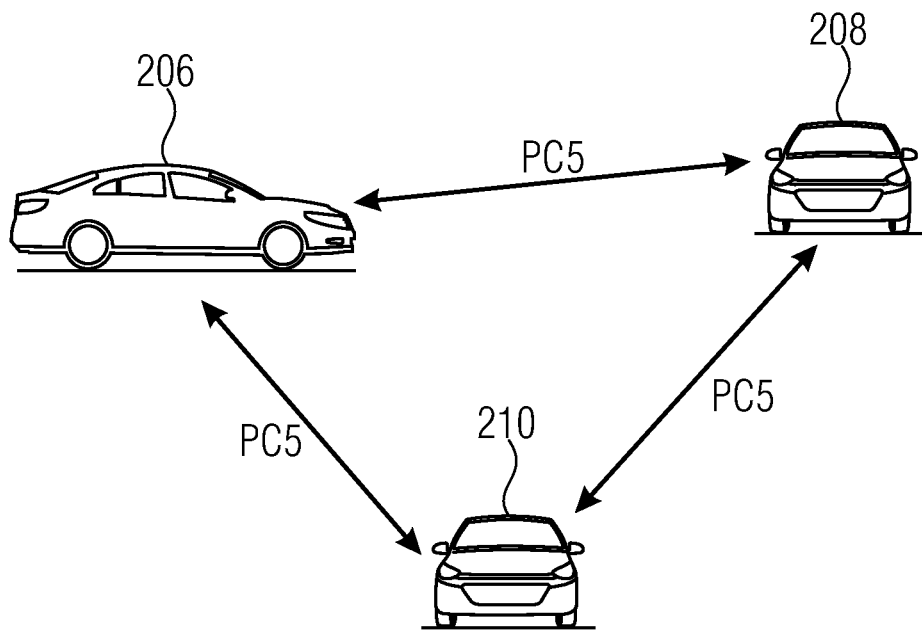
FIG. 3 is a schematic representation of an out-of-coverage scenario in which UEs directly communicating with each other receive no SL resource allocation configuration or assistance from a base station.
Figure 4:
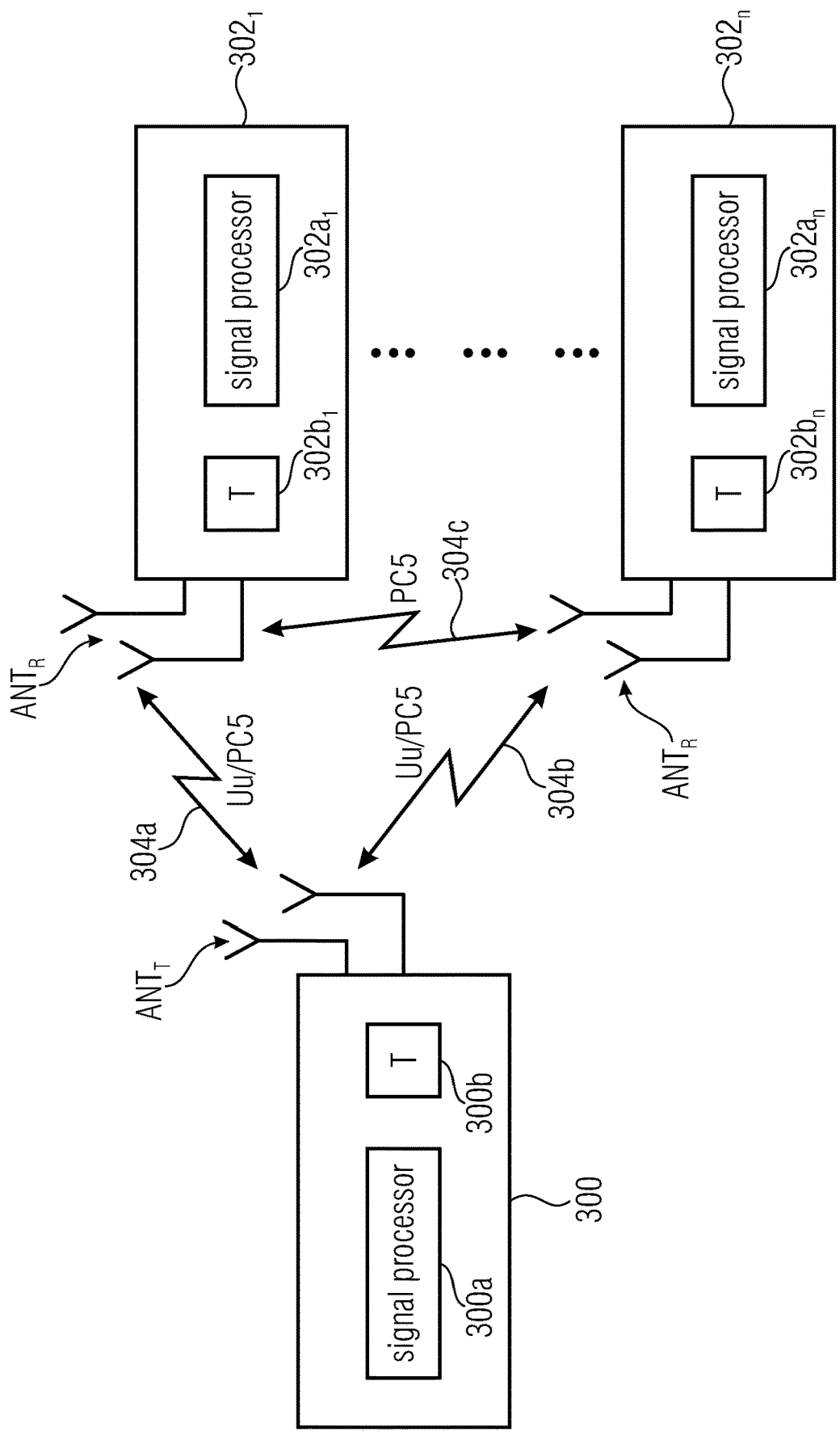
FIG. 4 is a schematic representation of a wireless communication system including a transmitter, like a base station, and one or more receivers, like user devices, UEs.

Embodiments of the present invention may be implemented in a wireless communication system as depicted in FIG. 1, FIG. 2, and FIG. 3 including base stations and users, like mobile terminals or IoT devices. FIG. 4 is a schematic representation of a wireless communication system including a transmitter 300, like a base station, and one or more receivers 3021 to 302n, like user devices, UEs. The transmitter 300 and the receivers 302 may communicate via one or more wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas $ANT_R$ or an antenna array having a plurality of antennas, a signal processor $302a_1$, $302a_n$, and a transceiver $302b_1$, $302b_n$ coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs and the base stations may operate in accordance with the inventive teachings described herein.

Apparatus

The present invention provides (see for example claim 1) an apparatus for a wireless communication system, wherein
the apparatus is configured to be connected to at least one UE via a sidelink for a sidelink communication with the one or more UEs, and
the apparatus is configured to
obtain distance information representing a certain communication range or a certain distance around the apparatus, and
perform a communication with one or more UEs at or within the certain communication range or the certain distance at a first priority to meet a predefined QoS, and
perform a communication with one or more UEs outside the certain communication range or the certain distance at a second priority, the first priority being higher than the second priority to meet a predefined QoS.

The present invention provides (see for example claim 2) an apparatus for a wireless communication system, wherein
the apparatus is configured to be connected to at least one UE via a sidelink for a sidelink communication with the one or more UEs, and
the apparatus is configured to
run, together with the at least one UE, an application, the application configured to provide a service with a certain Quality-of-Service, QoS, and
obtain distance information representing a communication range or a distance between the apparatus and the at least one UE that may be used to meet or fulfill the certain QoS.

In accordance with embodiments (see for example claim 3), the communication range comprises one or more of:
a physical distance, e.g., measured in meters, between the apparatus and the at least one UE, the apparatus configured to receive the distance information from an upper-layer in the protocol stack, like the application layer, e.g., via control information, like in a DCI over the Uu interface, or in a SCI over the PC5 interface,
a radio distance captured by radio measurements performed by the apparatus, wherein distance information may represent the radio distance by, e.g., the Received Signal Strength Indication, RSSI, the Reference Signals Received Power, RSRP, the Reference Signal Received Quality, RSRQ, pathloss information, using, e.g., large scale parameters, channel-state-information or as a function of the transmitted power,
a targeted geographical area, the apparatus configured to receive the distance information from an upper-layer in the protocol stack, like the application layer, e.g., via a Cooperative Awareness message, CAM, or a Decentralized Network message, DENM.

In accordance with embodiments (see for example claim 4),
the communication range comprises a minimum required communication range between the apparatus and the at least one UE,
the minimum required communication range may be used to meet or fulfill the certain QoS, or
a communication with UEs within the minimum required communication range is performed with the first priority.

In accordance with embodiments (see for example claim 5), to obtain distance information, the apparatus is configured to obtain the distance information, e.g., from an upper-layer in the protocol stack, like the application layer, and wherein the distance information is configured responsive to one or more of:
a type of the application, like the use case,
a type of service provided by the application, and
a type of the apparatus.

In accordance with embodiments (see for example claim 6), the apparatus is a vehicular apparatus being part of a vehicle, and wherein the type of vehicle comprises:
a Vehicle Type 1 specifying a length x, e.g., in meter, a width y, e.g., in meter, and a height z, e.g., in meter of a first kind of vehicle, like a car,
a Vehicle Type 2 specifying a length x, e.g., in meter, a width y, e.g., in meter, and a height z, e.g., in meter of a first kind of vehicle, like a van, and
a Vehicle Type 3 specifying a length x, e.g., in meter, a width y, e.g., in meter, and a height z, e.g., in meter of a first kind of vehicle, like a truck.

In accordance with embodiments (see for example claim 7), the communication range comprises a minimum required communication range between the apparatus and the at least one UE, wherein
the minimum required communication range may be used to meet or fulfill the certain QoS, or
a communication with UEs within the minimum required communication range is performed with the first priority, and
wherein, to meet or fulfill the certain QoS or to perform the communication with the first priority, when the communication range or the distance between the apparatus and the at least one UE corresponds to or is close to the minimum required communication range, the apparatus is configured to
use a slot-based PSCCH and PSSCH for the sidelink communication by modifying the link adaption to a high priority MCS and TBS which is mapped to the QoS and the communication range, e.g., use a low MCS for a high QoS and a low communication range, wherein, optionally, the power control may be adapted, or use a non-slot based transmission, where the communication is performed on a mini-slot for the same given communication range with higher power so as to reduce the transmission time, or reduce a frequency and maintain the time to be one slot, wherein the power is increased so as to reduce the transmission time.

In accordance with embodiments (see for example claim 8), the communication range comprises a semi-flexible communication range based on a fixed communication range and a measured communication range, the fixed communication range may be obtained from an upper-layer in the protocol stack, like the application layer, and the measured communication range may be obtained from radio measurements performed by the apparatus.

In accordance with embodiments the radio measurements performed by the apparatus are calculated from the RSSI or the RSRP, or are based on sidelink range measurements with respect to surrounding UEs using, e.g., the Primary Sidelink Synchronization Channel, PSSS, or the Secondary Sidelink Synchronization Channel, SSSS, or the Demodulation Reference Signals, DMRS, or are based on a power measurement available, e.g., from third party sources.

In accordance with embodiments to meet or fulfill the certain QoS or to perform the communication with the first priority, the apparatus is configured to use a slot-based PSCCH and PSSCH for the sidelink communication by modifying the link adaption to a high priority MCS and TBS which is mapped to the QoS and the communication range, e.g., use a low MCS for a high QoS and a low communication range, wherein, optionally, the power control may be adapted, or use a non-slot based transmission, where the communication is performed on a mini-slot for the same given communication range with higher power so as to reduce the transmission time, or reduce a frequency and maintain the time to be one slot, wherein the power is increased so as to reduce the transmission time.

In accordance with embodiments the communication range comprises a flexible communication range completely obtained from radio measurements performed by the apparatus.

In accordance with embodiments the radio measurements performed by the apparatus are calculated from the RSSI or the RSRP, or are based on sidelink range measurements with respect to surrounding UEs using, e.g., the Primary Sidelink Synchronization Channel, PSSS, or the Secondary Sidelink Synchronization Channel, SSSS, or the Demodulation Reference Signals, DMRS, or are based on a power measurement available, e.g., from third party sources.

In accordance with embodiments, the apparatus is configured to obtain distance information representing a plurality of communication ranges or a distances between the apparatus and the at least one UE, plurality of communication ranges or a distances comprising at least a first communication range or distance and a second communication range or distance, the first communication range or distance may be used to meet or fulfill a first QoS or to perform the communication with the first priority, and the second communication range or distance may be used to meet or fulfill a second QoS or to perform the communication with the second priority.

In accordance with embodiments, the first communication range comprises a minimum required communication range between the apparatus and the at least one UE that may be used to meet or fulfill the first QoS or to perform the communication with the first priority, for a communication within the first communication range, the apparatus is configured to apply a reduced transmission power, and/or use a grant-free access using, e.g., resources reserved for high priority only, and/or set the transmission parameters to ensure a high reliability transmission, e.g., select an appropriate MCS, use packet duplication, and the like, and for a communication within the second communication range, the apparatus is configured to receive a message via an eNB broadcast, and/or receive/send a message on the sidelink with a timely offset using a relatively higher transmission power.

In accordance with embodiments, the first communication range or distance and the second communication range or distance are determined based on a measurement threshold.

In accordance with embodiments, the apparatus is configured to create a discovery list of UEs in the surroundings of the apparatus, the lists indicating which of the plurality of communication ranges or a distances a surrounding UE belongs to.

In accordance with embodiments, the apparatus is configured to sort the UEs in the discovery list based on measurements, e.g., power, RSSI, RSRP, or distance information, wherein the UEs may be identified by the physical destination ID of the UEs, e.g., for a unicast communication, or by a group ID of a group communication, e.g., for a groupcast communication, wherein the ID information may be conveyed in the SCI.

In accordance with embodiments, in case the physical IDs are not available, the apparatus is configured to:

refer to upper layers of the protocol stack, e.g., to use an upper layer ID, like the L2 destination ID, or allocate a virtual ID for every discovered UE, which may be used, e.g., for safety messages and broadcast messages only.

In accordance with embodiments, the apparatus is configured to adapt the discovery list responsive to changes in the QoSs associated with the plurality of communication ranges or a distances.

In accordance with embodiments, the apparatus is configured to map the communication range, one or more QoS characteristics, and a system or application QoS flows, e.g., as follows:

the communication range may be mapped to different MCS/TBS/Power control which is mapped to different QoS flows, or the QOS flows may be mapped to one or more communication ranges, which are mapped to one or more MCS/TBS/TPC.

In accordance with embodiments, for a broadcast communication on the sidelink to UEs at the minimum required communication range, the apparatus is configured to
- map the minimum required communication range to a predefined transmit power, and/or
- map each of a plurality of minimum required communication ranges for different QoSs to a predefined transmit power is proposed, wherein the mapping may be enhanced based, e.g., on RF conditions, like interference or traffic load, or on environmental conditions, like weather or mountains, which may be derived, e.g., from vehicular measurements and channel state information.

In accordance with embodiments, the apparatus comprises several antennas or antenna ports so as to allow for a directional communication, the apparatus configured to direct a communication to
- UEs following or driving in parallel to the apparatus, or
- UEs driving in the same direction.

In accordance with embodiments, to obtain the distance information, the apparatus is configured to
- transmit a request, e.g., a feedback request or a positioning request,
- receive form one or more UEs respective responses to the request, each response including a fixed time offset and data indicative of a position of the UE sending the response, e.g., GNSS information or GPS coordinates, and
- determine from a round trip time of flight, RTF, from the sending of the request until receipt of the response, and the data indicative of the position of the UE, a distance between the apparatus and the UE sending the response.

In accordance with embodiments, the apparatus is configured to
- triangulate the position of the apparatus using data indicative of a position of multiple stationary network entities, like an RSU, an eNB, a gNB or a static UE, each response further includes,
- determine from the RTF, the position of the UE and the position of the apparatus, the distance between the apparatus and the UE sending the response In accordance with embodiments,
- the time offset is received in a control channel of the sidelink, e.g., in a SCI, or in any other sidelink channel, and
- the data indicative of a position of the UE, like the GPS coordinates, are included in a Cooperative Awareness Message, CAM, or a Decentralized Environmental Notification Message, DENM, or a V2X message defined for NR_V2X and later releases which support all types of communication.

In accordance with embodiments, the request is transmitted periodically, or aperiodically or randomly.

In accordance with embodiments, the apparatus is configured to initiate a feedback mechanism, e.g., HARQ, only for the communication with one or more UEs at or within the certain communication range or the certain distance.

The present invention provides an apparatus for a wireless communication system, wherein
- the apparatus is configured to be connected to at least one UE via a sidelink for a sidelink communication with the one or more UEs, and
- the apparatus is configured to
  - obtain distance information representing a certain communication range or a certain distance around the apparatus, and
  - initiate a feedback mechanism, e.g., HARQ, for a communication with one or more UEs at or within the certain communication range or the certain distance.

In accordance with embodiments, the apparatus is configured to not initiate the feedback mechanism for the communication with one or more UEs outside the certain communication range or the certain distance.

In accordance with embodiments, in case the apparatus transmits data to the one or more UEs, the apparatus is to signal to the one or more UEs, e.g., in a sidelink control channel, when the feedback mechanism is initiated.

In accordance with embodiments, in case the apparatus received data from to the one or more UEs, the apparatus is to determine that a transmitting UE has initiated the feedback mechanism responsive to
- a signal from the transmitting UE, e.g., in a sidelink control channel, indicating that the feedback mechanism is initiated, or
- the transmitting UEs being at or within the certain communication range or the certain distance.

In accordance with embodiments, the apparatus comprises one or more of a mobile terminal, or stationary terminal, or cellular IoT-UE, or vehicular UE, or an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, e.g., a sensor or actuator.

System

The present invention provides a wireless communication system comprising one or more base stations, and a plurality of user devices, UEs, at least some of the UEs comprising an apparatus according to the present invention.

In accordance with embodiments, the base station comprises one or more of a macro cell base station, or a small cell base station, or a central unit of a base station, or a distributed unit of a base station, or a road side unit, or a UE, or a remote radio head, or an AMF, or an SMF, or a core network entity, or a network slice as in the NR or 5G core context, or any transmission/reception point, TRP, enabling an item or a device to communicate using the wireless communication network, the item or device being provided with network connectivity to communicate using the wireless communication network.

Method

The present invention provides a method for operating an apparatus for a wireless communication system, wherein the apparatus is connected to at least one UE via a sidelink for a sidelink communication with the one or more UEs, the method comprising:
- obtaining distance information representing a certain communication range or a certain distance around the apparatus,
- performing a communication with one or more UEs at or within the certain communication range or the certain distance at a first priority to meet a predefined QoS, and
- performing a communication with one or more UEs outside the certain communication range or the certain distance at a second priority, the first priority being higher than the second priority to meet a predefined QoS.

The present invention provides a method for operating an apparatus for a wireless communication system, wherein the apparatus is connected to at least one UE via a sidelink for a sidelink communication with the one or more UEs, the method comprising:

running on the apparatus, together with the at least one UE, an application, the application configured to provide a service with a certain Quality-of-Service, QoS, and obtaining distance information representing a communication range or a distance between the apparatus and the at least one UE that may be used to meet or fulfill the certain QoS.

The present invention provides a method for operating an apparatus for a wireless communication system, wherein the apparatus is connected to at least one UE via a sidelink for a sidelink communication with the one or more UEs, the method comprising:

obtaining distance information representing a certain communication range or a certain distance around the apparatus, and initiating a feedback mechanism, e.g., HARQ, for a communication with one or more UEs at or within the certain communication range or the certain distance.

Computer Program Product

The present invention provides a computer program product comprising instructions which, when the program is executed by a computer, causes the computer to carry out one or more methods in accordance with the present invention.

Thus, embodiments of the present invention provide improvements and enhancements in the communication over a sidelink by using the proximity awareness of a UE. An advantage of the inventive approach is that it allows meeting for certain use cases, like the above-mentioned platooning, specific low-latency/high-reliability requirements, as well as to fulfill respective QoS levels provided the communication partner is within the minimum required communication range, i.e., the communication range that may be used to meet the just mentioned QoS requirements. For example the inventive approach may be applied whenever a communication within the near distance is more important, for example, has a higher priority, than a communication exchange with a communication partner or UE that is further away, so as to ensure the low-latency/high-reliability demands of certain use cases, for example, platooning. When considering the platooning use case, the minimum communication distance may be related to an emergency situation, like an expected breaking, which effects mostly and immediately all the vehicles in close proximity. Thus, when considering a situation in which one vehicle within the platoon performs an expected breaking, this is communicated among the other members of the platoon, and the minimum communication range is selected such that a proximity or distance between the respective UEs allows for transmitting the message about the unexpected breaking to and processing the message by the other platoon members provides sufficient time to avoid crashes or the like.

The inventive approach is not limited to the QoS requirements or to certain emergency situations, rather, it may be applied to any situation in which the communication from one UE to another UE involves that the other UE performs some action, like breaking or the like, for which time, in addition to the signal processing and the signal transmission, is needed. Besides the QoS mechanism, another issue that may be of interest in accordance with embodiments is the implementation of retransmission mechanisms. To avoid any waste of resources and the like, retransmissions which may not be processed by the UEs within the minimum time are avoided.

Thus, embodiments of the present invention improve the delivered QoS for V2X based communications taking into consideration the communication range or the distance among the UEs communicating over the sidelink. Another effect is that resource wasting is avoided by taking into consideration the communication range or distance on the sidelink when deciding whether certain mechanisms in the communication are to be activated, like a feedback mechanism, for example a HARQ mechanism.

In accordance with embodiments, a minimum required communication range may be a range of communication that covers:

a relative physical distance measured in meters between the UEs; in this case, the distance information may be conveyed by upper-layers or may be conveyed using control information, for example over the Uu interface or using the Sidelink Control Information, SCI, or a radio distance captured by a UE measurement; the UE measurement may include a measurement of the Received Signal Strength Indicator, RSSI, the Reference Signal Received Power, RSRP, the Reference Signal Received Quality, RSRQ, the path loss, different general-state-information or as a function of the transmitted power, or a targeted geographical area as provided by upper layers, for example, including coverage area and directions, which may be transmitted via the Cooperative Awareness Message, CAM, or the Decentralized Environmental Notification Message, DENM.

Figure 5A:
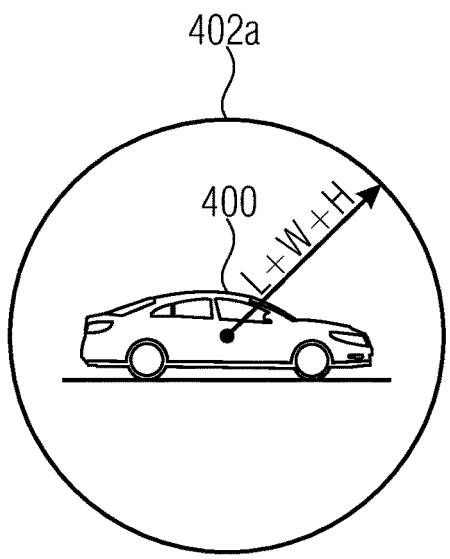
FIG. 5a-5c illustrates an embodiment in accordance with which a pre-configured communication range is based on a type of a vehicle, like a car shown in FIG. 5(a), a van shown in FIG. 5(b) and a truck shown in FIG. 5(c)
Figure 5C:
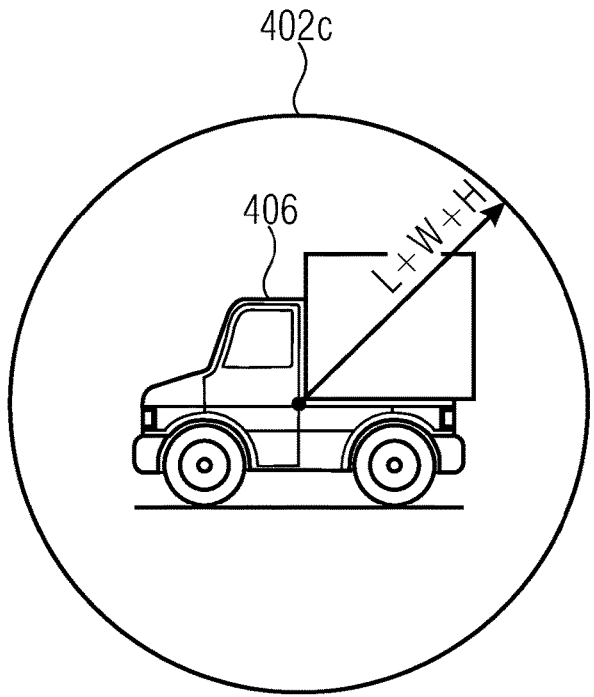
Figure 5B:
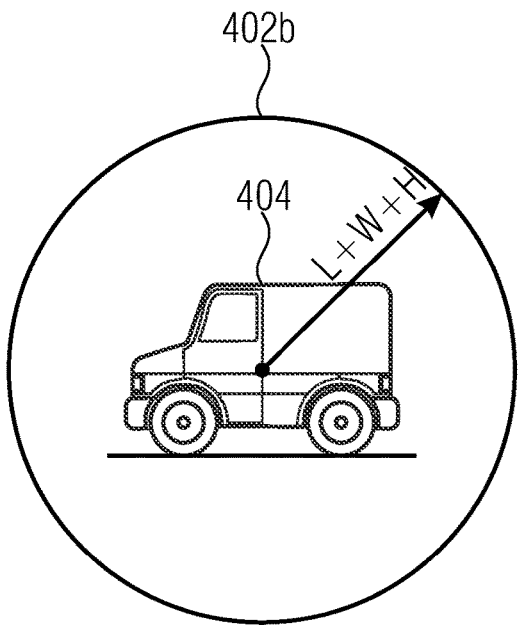

In accordance with embodiments, the minimum required communication range may be employed for unicast and groupcast communications among UEs communicating over a sidelink. The minimum required communication range may be pre-configured and may be provided by higher layers. The pre-configured minimum required communication range may be impacted by the application time or type, the service type or the UE type. For example, when considering vehicles, different vehicle types may be assumed. For example, vehicle type 1 may be associated with a conventional car, vehicle type 2 may be associated with a conventional van, and vehicle type 3 may be associated with a truck. The respective vehicle types are described by respective length, width and height dimensions, for example in meters, of the vehicle. FIG. 5 illustrates an embodiment in accordance with which the pre-configured communication ranges are based on the type of a vehicle. FIG. 5(a) illustrates a car that includes a user device for which a certain minimum communication range is to be employed to see whether certain requirements or mechanisms may be achieved/employed when communicating with another UE, i.e., dependent on whether the UE is outside or inside the minimum communication range. As mentioned above, dependent on the vehicle type, the pre-configured communication range is determined. In FIG. 5(a) the minimum required communication range 402a is indicated. As is shown by the arrow L+W+H, the communication range 402a takes into consideration the dimension of the vehicle, namely its length, its width and its height. In a similar way as FIG. 5(a), FIG. 5(b) also shows a communication range 400b, however, not for a car but for a van 404, and in FIG. 5(c) the communication range 400c is illustrated for a truck 406. In FIG. 5(b) and in FIG. 5(c) the communication range 400b, 400c is preconfigured dependent on the vehicle type, i.e., dependent on the length, the width, and the height of the van 404 and the truck 406, respectively. In FIG. 5, the center of the minimum required communication range 402a to 402c is assumed to be the center of mass of the respective vehicle 400, 404, 406 in consideration.

In accordance with embodiments, the minimum required communication range may be employed for the sidelink communication among the UEs using slot-based PSCCH and PSSCH for the sidelink communication, wherein the respective sidelink may be adapted by mapping a high priority MCS and TBS to the QoS value and the communication range. For example, a low MCS may be employed for a high QoS and for a low communication range. Also, the power control may be adapted, and as is described with reference to further embodiments below concerning the mapping of the MCS/TBS/TPC (TPC=Transmitter Power Control) to respective communication ranges.

In accordance with other embodiments, a non-slot transmission may be employed and the communication may be performed on a mini-slot for the same communication range but with a higher power, thereby reducing the transmission time. This involves short-time sensing and may boost the transmission power to coexist with other possible collisions.

Another embodiment for the transmission taking into consideration the minimum required communication range may reduce the frequency by maintaining the time to be one slot so that the power is increased which may also be referred to as a data compression.

The above embodiments may be useful for higher priority information, for example limited data transmission with high/very-high QoS flow values. The data may be allocated to dedicated resources or grant-free resources, which content with other UEs, may be used, or preconfigured resources may be used. The use of grant-free resources or pre-configured resources may use sensing for a short-time or long-time or may use one short sensing.

In accordance with other embodiments, other than using pre-configured minimum required communication ranges, the communication range may be semi-flexible, i.e., it may be based on fixed values and measurement values. In such embodiments, not only the minimum communication range is provided by an upper layer, rather, a flexible communication range is used by including radio measurements. The radio measurements may be calculated from the RSSI or RSRP or may be based on sidelink measurements with respect to surrounding UEs or vehicles. Also, power measurements available from other sources may be employed, for example, the power may be selected from a plurality of power values based on environmental conditions or based on a sensor input. The sensor input or the environmental conditions may cover speed, weather, vehicle traffic situations, like rush hour, etc., and may further include any upper-layer parameters, e.g., the priority of the packet, the category of the service level or any other QoS flow. The mapping may function as in the previous embodiment, and the transmission taking into consideration the minimum required communication range may be done as described above with reference to the embodiment making use of the pre-configured minimum required communication ranges.

Another embodiment makes use of flexible communication ranges which, other than the just described embodiment, is completely based on measurements. The advantage of the flexible communication range may be that there is a higher reachability and that adapted distances may be used. Further, there may be more time to collect information for determining the minimum required communication range. Another advantage is that it may adapt with the discovery mechanisms described above, like the direct discovery and the network discovery.

As mentioned above, the measurements may be based on RSSI, RSRQ or CSI measurements. Further, the measurements may be based on radio range measurements on the sidelink, and the sidelink based radio range measurements may be calculated using the Primary Sidelink Synchronization Channel, PSSS, or the Secondary Sidelink Synchronization Channel, SSSS, or the Demodulation Reference Signals, DMRS.

Figure 6B:
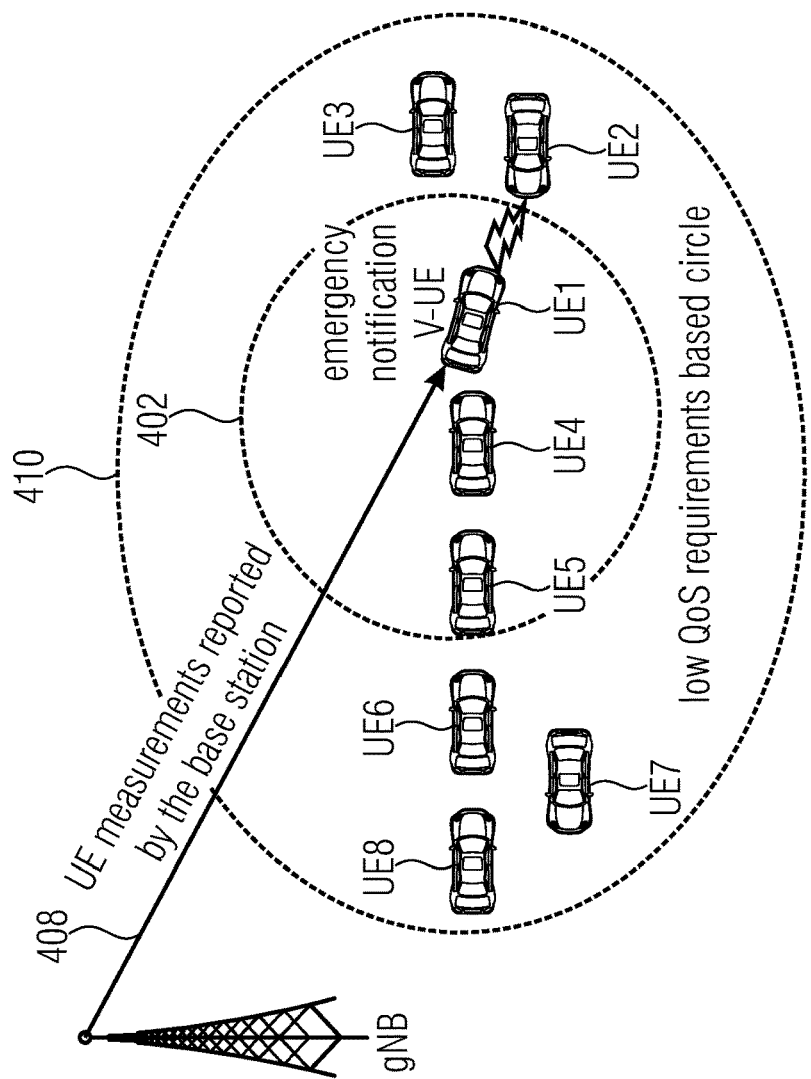
Figure 6A:
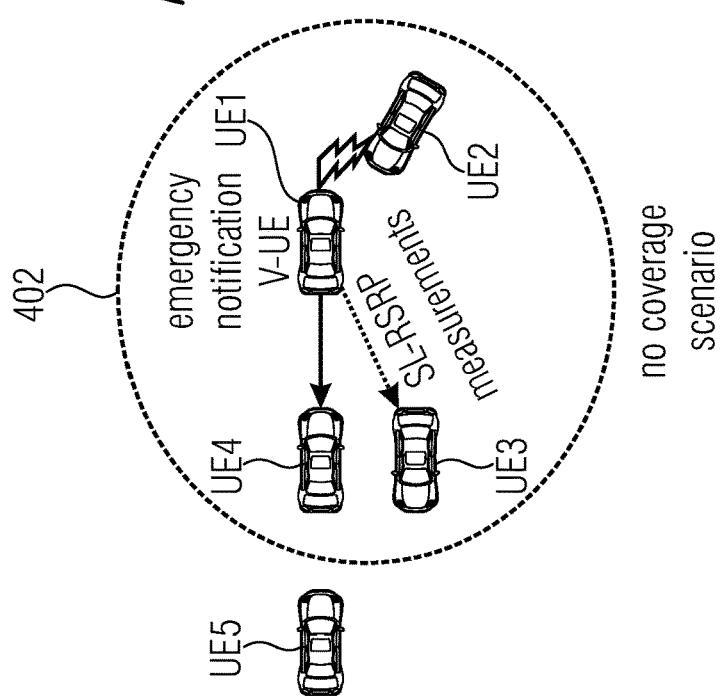

The flexible communication range being completely based on measurements is advantageous as it provides the possibility of serving the vehicles in the vicinity with adaptive QoS. FIG. 6 illustrates a scenario employing a flexible communication range being based on measurements performed by the UEs. FIG. 6(a) illustrates a non-coverage scenario, and FIG. 6(b) illustrates an in-coverage scenario. As is shown in FIG. 6(a) a UE1 performs respective measurements on the sidelink, SL, to the other mobile users UE2 to UE5, for example SL-RSRP measurement. Based on these measurements, the UE1 determines the minimum required communication range 402. For example, in case of an emergency, the UE1 is referred to as the emergency notification V-UE (V-UE=vehicular UE), and the closest proximity vehicles are delivered and emergency messages, for example in case of a danger of a crash or the like, to allow the other vehicles to take evasive action. In the example of FIG. 6(a), the respective proximity vehicles are UE2, UE3 and UE4.

FIG. 6(b) illustrates a scenario employing a flexible communication range when the respective UEs communicate over the sidelink and are in an in-coverage scenario. FIG. 6(b) illustrates the base stations gNB as well as a plurality of UEs, UE1 to UE8, within coverage of the base station. At least some of the UEs may communicate with each other over the sidelink. The base station provides measurements from the respective UEs to the UE1 or to the vehicle including the UE1, as is illustrated by arrow 408. Based on the reported measurements UE1 determines its minimum required communication range that is depicted by the inner circle 402. In addition, FIG. 6(b) illustrates an outer circle 410. For example, in case there is a danger of a crash noticed by a vehicle, like UE1, the base station gNB is immediately requested to grant the resources to UE1 based on a certain quality of service. Using the resources, the closest proximity vehicles are delivered the message notification of a potential crash immediately. Within the inner circle 402, which is derived from the minimum required communication range, the following rules may apply:

- a reduced transmission power is used because of the limited size of the inner circle 402,
- grant-free access is employed, for example, resources may be used that are reserved for high priority transmissions,
- the parameter settings are such that a high reliability is ensured, for example, a suitable MCS is selected, or a feedback mechanism including, for example packet duplication or retransmissions is enabled.

On the other hand, in the outer proximity circle 410 the following rules may apply:

- the gNB that also received the emergency message broadcasts this message to the UEs, namely UE2 to UE8 in a usual format, or
- the notification is sent by UE1 on the sidelink with a timely offset using a high transmission power.

Figure 7:
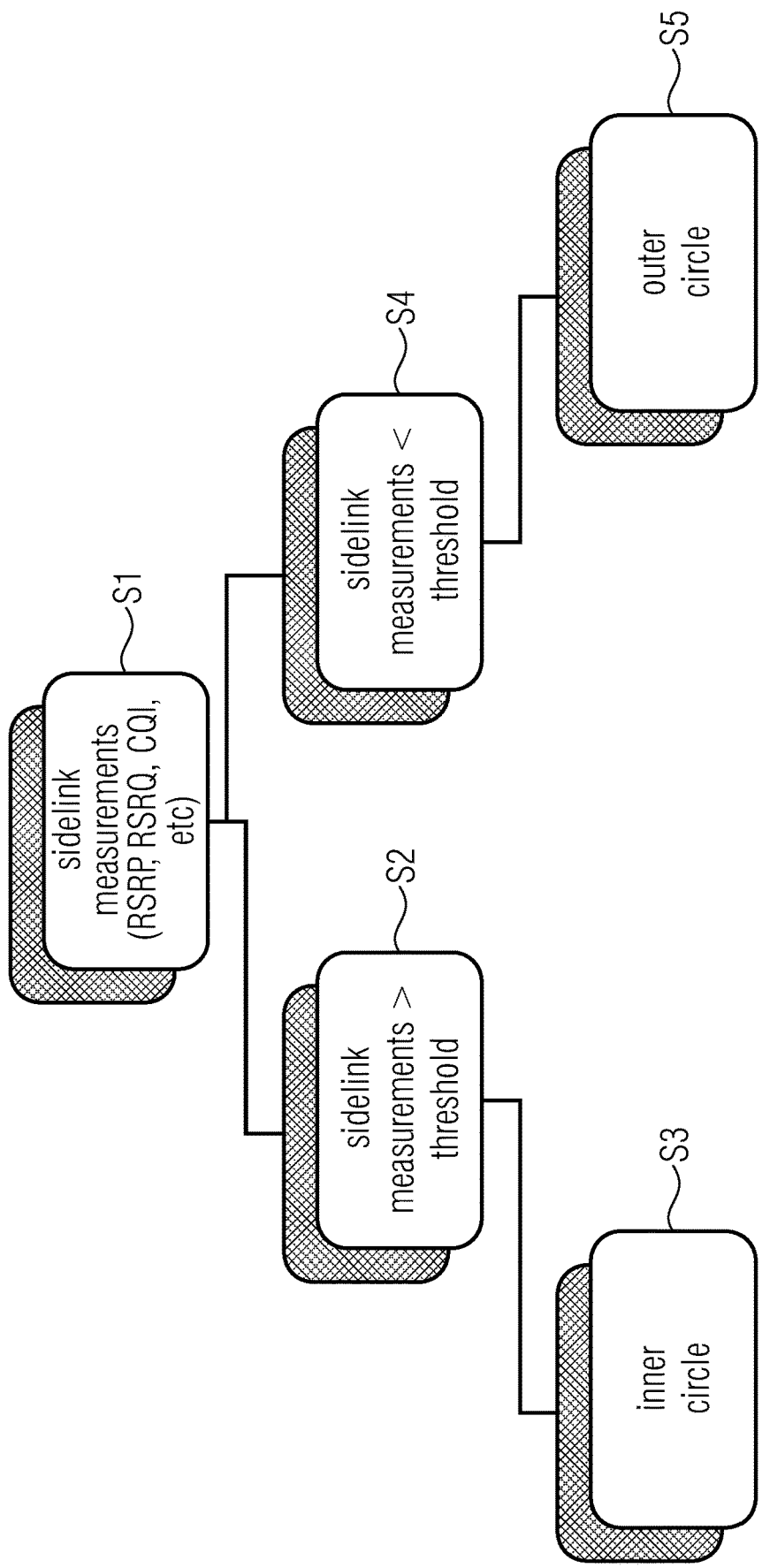
FIG. 7 illustrates a flowchart for adapting the inner proximity and the outer proximity circles described above with reference to FIG. 6(b) or the border between the inner proximity and the outer proximity areas.

The setting of the respective circles 402, 410 or, in other words, the setting of the border between the close proximity vehicles and the outer proximity vehicles may be based on one or more measurement thresholds which, in accordance with embodiments, supports identifying a highest priority circle. FIG. 7 illustrates a flowchart for adapting the circles 402, 410 described above with reference to FIG. 6(b) or the border between the inner proximity and the outer proximity areas. Initially, in accordance with embodiments, sidelink measurements may be performed by UE1, for example measurements of the RSRP, RSRQ, CQI and the like as indicated at S1 in FIG. 7. In case the sidelink measurements exceed a certain threshold, as is indicated at S2 in FIG. 7, UEs connected to the measuring UE1 via such sidelinks are considered to be within the inner circle 402, as is indicated at S3 in FIG. 7, and in the example of FIG. 6(b). The sidelink measurements on the sidelinks from UE1 to UE4 and to UE5, respectively, are assumed to be above the threshold so that UE4 and UE5 are within the inner circle 402. On the other hand, in case measurements on sidelinks are below the threshold as is indicated at S4 in FIG. 7, the respective UEs are considered to be in the outer circle 410, as is indicated at S5. In the example of FIG. 6(b) the sidelink measurements or the sidelinks to UE2, UE3, and UE6 to UE8 are less than a certain threshold, for example, the RSRP, RSRQ, CQI measurements are below a threshold, that UE2, UE3 and UE6 to UE8 are considered to be outer proximity vehicles or UEs.

Figure 8:
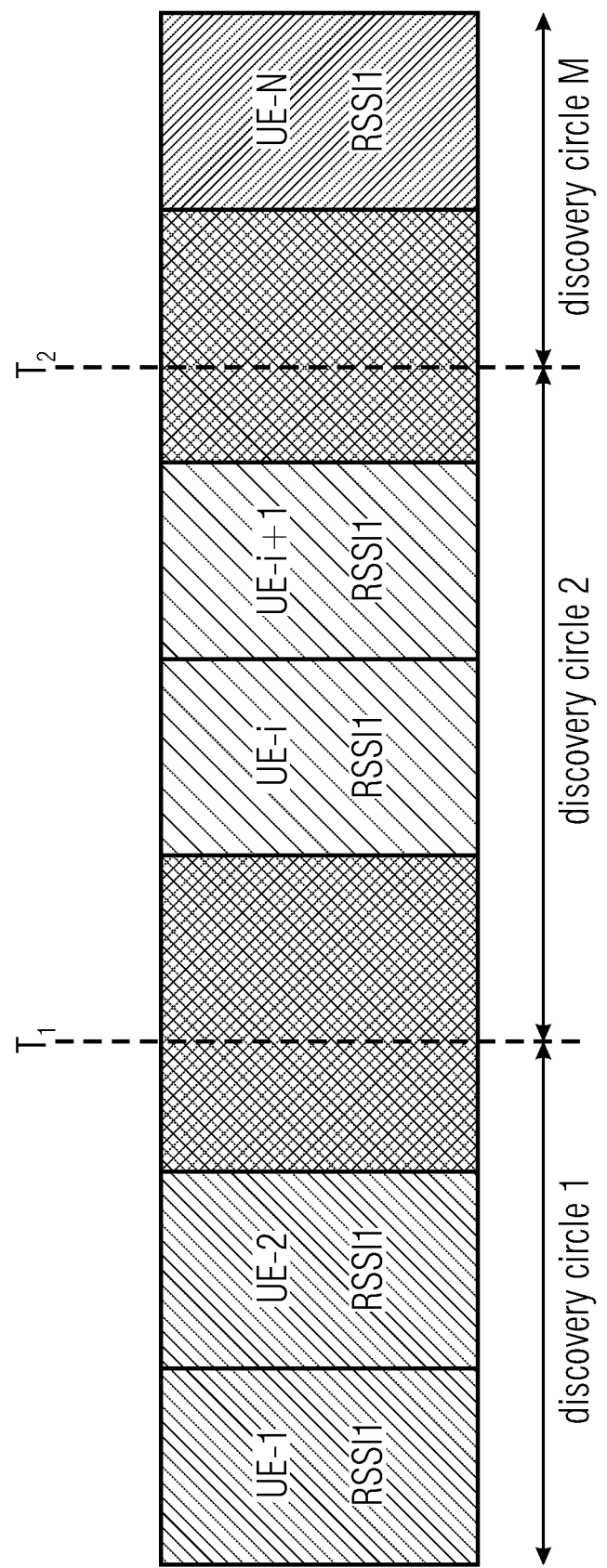
FIG. 8 illustrates an embodiment for an enhanced discovery mechanism in accordance with embodiments of the present invention.

In accordance with further embodiments, the above-described conventional discovery mechanisms may be enhanced by employing the above-described principles placing respective UEs dependent on the sidelink measurements within certain proximity circles. Likewise, the principle may be used to enhance the discovery mechanism and in such a case, the discovery may consider all the physical layer parameters, for example it may include measurements and physical layer IDs. For example, the above-described outer circle 402 may be considered a new discovery mechanism where the UEs are discovered and associated to different circles, for example by splitting the outer circles 410 into one or more regions. FIG. 8 illustrates an embodiment for an enhanced discovery mechanism in accordance with embodiments of the present invention. For example, whenever a certain measurement of the sidelink, like a measured SL power/RSSI/RSRP is larger than a certain threshold, the discovery circles 1 to M illustrated in FIG. 8 apply, and the UEs may be sorted according to the geographic locations. In FIG. 8 UEs having an RSSI above the threshold T1 are associated with a first discovery circle, while UEs with a RSSI between thresholds T1 and T2 are associated with a second discovery level, and so on.

The discover circles mentioned above with reference to FIG. 8 represent a coverage area or communication range, and the number of circles may depend on the QoS and/or on the communication range that may be used. The complied sorted list may be used for discovery enhancement mechanisms, for example to introduce proximity and distance based aware communications.

The sorting of the UEs in accordance with the discovery list of FIG. 8 may be done based on the above-mentioned measurements on the sidelink, for example on the basis of power, RSSI, RSRP measurements, or it may be based on distance information obtained otherwise. The UE IDs may be the physical destination ID of the UEs for a unicast communication or the group ID for a groupcast communication. This information may be conveyed using the SCI.

In case a physical ID is not available, the discovery mechanism may refer to upper layers, for example using the L2 destination ID, or it may allocate a virtual ID for every discovered UE which may then be used for certain messages, like safety messages and/or for broadcast only.

In accordance with further embodiments, to further enhance the physical layer discovery, the communication to the UEs in the discovery list may be adapted to the actual QoS and the actual communication range as defined, for example, by the circles mentioned above.

In the following, embodiments for mapping the minimum required communication range and the QoS requirements is described in more detail. With regard to the minimum required communication range, it is noted that this may be the pre-configured communication range, the semi-flexible communication range or the flexible communication range mentioned above. The mapping, in accordance with embodiments, may be between the minimum required communication range and one or more of certain QoS characteristics, like reliability, Block Error Rate, BLER, latency, E2E latency, priority, and the system or application QoS requirements.

In accordance with an embodiment, a communication range is determined as described above and is mapped to different MCS/TBS/power control levels which is, in turn, a map to different QoS flows. A QoS flow means packets are classified and marked using a QFI (QOS Flow Identifier). The 5G QoS flows are mapped in the AN (Access Network) to DRBs (Data Radio Bearers). In case of a sidelink the radio bearers are termed as Sidelink Radio Bearers (SLRBs). It supports:

GBR QoS flow, involves guaranteed flow bit rate,
Non-GBR QoS flow, does not require guaranteed flow bit rate.

For example, table 1 below illustrates a first mapping possibility for a QoS flow 1.

TABLE 1

| QoS 1 | Range 1 ($0 < L1 < Lmax1$) | 1-MCS1/TBS1/TPC1 → BLER 1 |
| | | 1-MCS2/TBS2/TPC2 → BLER 2 |
| | | 2-MCS3/TBS3/TPC3 → BLER 3 |

Table 1 illustrates the flow QoS 1, which defines certain QoS requirements, BLER 1, BLER 2, BLER 3, for the system or an application or a service to be performed. For this QoS, the UE communicating with other UEs being in a range L1 that is between 0 and a maximum range, which is the minimum required range for the UE, fulfils the BLER 1of QoS 1 when using MCS1/TBS1/TPC1, the BLER 2 of QoS 1 when using MCS2/TBS2/TPC2 and the BLER 3 of QoS 1 when using MCS3/TBS3/TPC3 as is indicated in the right-hand column of Table 1.

In accordance with other embodiments, the mapping may be between the QoS flows and one or more communication ranges which are mapped to one or more MCS/TBS/TPC parameters, as is illustrated in table 2 below.

TABLE 2

| Range 1 ($0 < L1 < Lmax1$) | 1-MCS1/TBS1/TPC1 -- QoS 1 |
| | 1-MCS2/TBS2/TPC2 -- QoS 2 |
| | 2-MCS3/TBS3/TPC3 -- QoS 3 |

In Table 2, a UE communicating with other UEs over the sidelink which are within range L1 may achieve the QoSs 1, 2 or 3 when using MCS1/TBS1/TPC1, MCS2/TBS2/TPC2 and MCS3/TBS3/TPC3, respectively, as is indicated in the right-hand column of Table 2.

In accordance with other embodiments, the minimum required communication range may not be employed only for unicast or groupcast communications, but it may also be used for a broadcast communication over the sidelink. For a broadcast communication no measurements of any vehicles in the proximity may be available to other vehicles. However, to ensure that all vehicles within the defined minimum required communication range receive a notification on the sidelink from the transmitting UE, in accordance with embodiments, the defined minimum required communication range is mapped on a defined transmit power. In accordance with embodiments a basic mapping between each defined minimum required communication range and a predefined transmit power is suggested. In accordance with further embodiments, this mapping may be further enhanced based, for example, on the RF conditions, like an interference or traffic load, based on environmental conditions, like weather or mountains in the vicinity of the transmitting UE, which may be derived, for example, from vehicular measurements and from channel state information. In addition to the distance or communication range a driving direction may also be employed for improving the communication range. The driving direction may be available from CAM or DENM messages. For example, when considering vehicles, on the basis of a driving direction, notifications may only be provided for vehicles driving in parallel to the transmitting vehicle or vehicles driving in the same direction.

In accordance with embodiments, the vehicles or vehicular UEs may be assumed to have several antennas or antenna ports mounted by a vehicle, and in case a directional communication range is employed, the appropriate antenna/antenna port and, if supported, beamforming may also be employed to enhance the communication range that may be used. In other words, in accordance with embodiments, for example the circles described above may be modified so as to extend more in a driving direction of the vehicles, i.e., they become more elliptic, as less communication range may be needed in the direction traverse to the traveling direction due to the limited widths of the street on which the vehicles may travel while longer communication ranges may be needed along the street.

In accordance with further embodiments of the present invention, an accuracy with which the above-described minimum required communication range is determined may be enhanced. More specifically, the above-described semi-flexible communication range and the flexible communication range may be determined with an enhance accuracy. Basically, the just-mentioned approaches for determining the communication range in a semi-flexible way or in a flexible way may give a rough estimate of the distance between the transmitting UE and the receiving UE. In accordance with embodiments, to increase the accuracy of the distance between the receiving UE and the transmitting UE, GNSS information and a Roundtrip Time of Flight, RTF, are employed. In accordance with an embodiment, neighboring vehicles may be provided with active reflectors, similar as in the secondary radar principle. In case such neighboring vehicles receive a request from the transmitting vehicle, like a feedback request or a positioning request, the receiving UE may respond with a fixed time offset, which allows the determination of the RTF on the basis of which the distance between the transmitting UE and the receiving UE may be determined. In addition, within the response window determined by the time offset, the receiving UE includes its GPS coordinates. Based on the RTF and the coordinates the transmitting UE may more accurately determine the actual distance between the transmitting UE and the receiving UE. In accordance with embodiments, this may be extended to multiple receiving UEs that respond with a fixed time offset along with their respective GPS coordinates.

Figure 9:
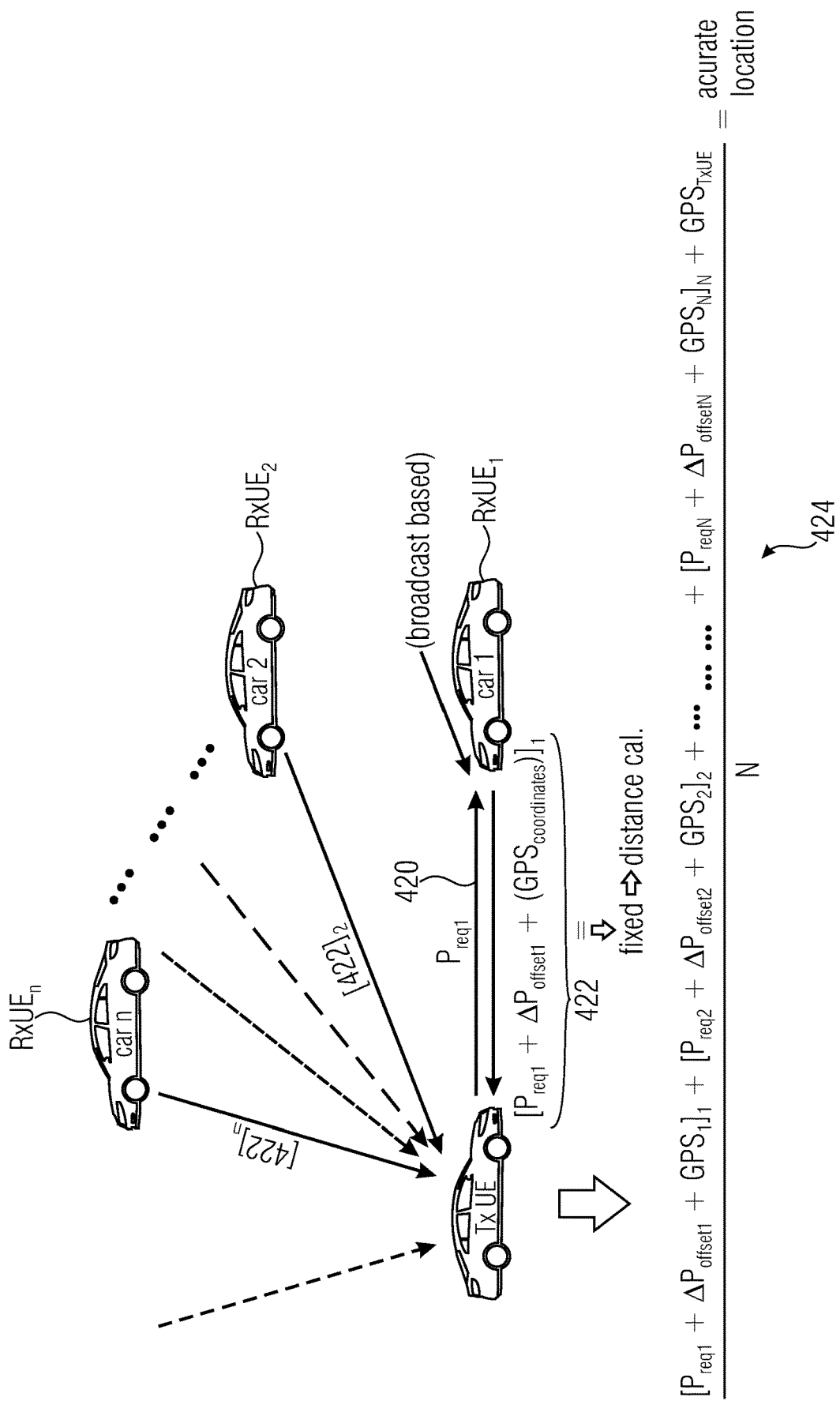
FIG. 9 illustrates an embodiment for enhancing the accuracy of the minimum required communication range as determined in accordance with the semi-flexible or flexible approach of the inventive approach.

FIG. 9 illustrates an embodiment for enhancing the accuracy of the minimum required communication range as determined in accordance with the semi-flexible or flexible approach as described above. FIG. 9 illustrates a transmitting UE as well as respective receiving UEs RxUE1 to Rx $UE_n$. In the example of FIG. 9 it is assumed that the Tx UE broadcasts the request, as indicated at 420 to all Rx UEs, however, in accordance with other embodiments, the request may be transmitted also using a unicast communication to a dedicated one of the Rx UEs or using a groupcast communication for transmitting the request 420 to a number of Rx UEs forming groups. Responsive to the request, each a Rx UE returns a message 4221 to 422, including the time at which the request 420 is received and the offset that may be used at the Rx UE to process the request 420 and to transmit the response 422, so that on the basis of this information, the distance from Tx UE to the respective Rx UE may be calculated. In addition, in accordance with embodiments, the GPS coordinates also may be included in the response 422 as mentioned above.

When employing multiple Rx UEs, as is depicted in FIG. 9, the Tx UE may average out GPS errors from all receiving UEs and of the transmitting UE itself, as is indicated in the lower part of FIG. 9 at 424.

$$\text{Accurate\_Location} = \frac{\left[P_{req1} + \Delta P_{offset1} + GPS_1\right]_1 + \left[P_{req2} + \Delta P_{offset2} + GPS_2\right]_2 + \ldots + \left[P_{reqN} + \Delta P_{offsetN} + GPS_N\right]_N + GPS_{own}}{N}$$

where in the equation above, the variables are as follows:

$P_{reqN}$ denotes the request for feedback or positioning, $\Delta P_{offsetN}$ indicates the time offset by which the UE's send the response, $GPS_N$ indicates the GPS location of the receiver UE, N is varying between 1 . . . and an integer value, denoting the number of vehicles included in the communication, $GPS_{own}$ indicates the GPS location of the transmitter UE.

It is mainly based on the idea of central limit theorem.

In accordance with embodiments, the request 420 may be sent periodically, a periodically or totally randomly.

In accordance with embodiments, only responses from those receiving UEs that include a time offset are considered to be valid responses. This avoids collisions in multiple responses.

The time offset may be included or transmitted using the control channel of the sidelink in a second stage of the SCI, or in case only a single stage SCI is used, it may be transmitted using the normal SCI format. In accordance with other embodiments, rather than transmitting the time offset information in the control channel, it may also be included in any of the other defined sidelink channels.

The GPS coordinates may be included in a CAM message or a DENM message or for a message defined specifically for groupcast or unicast communications.

Figure 10:
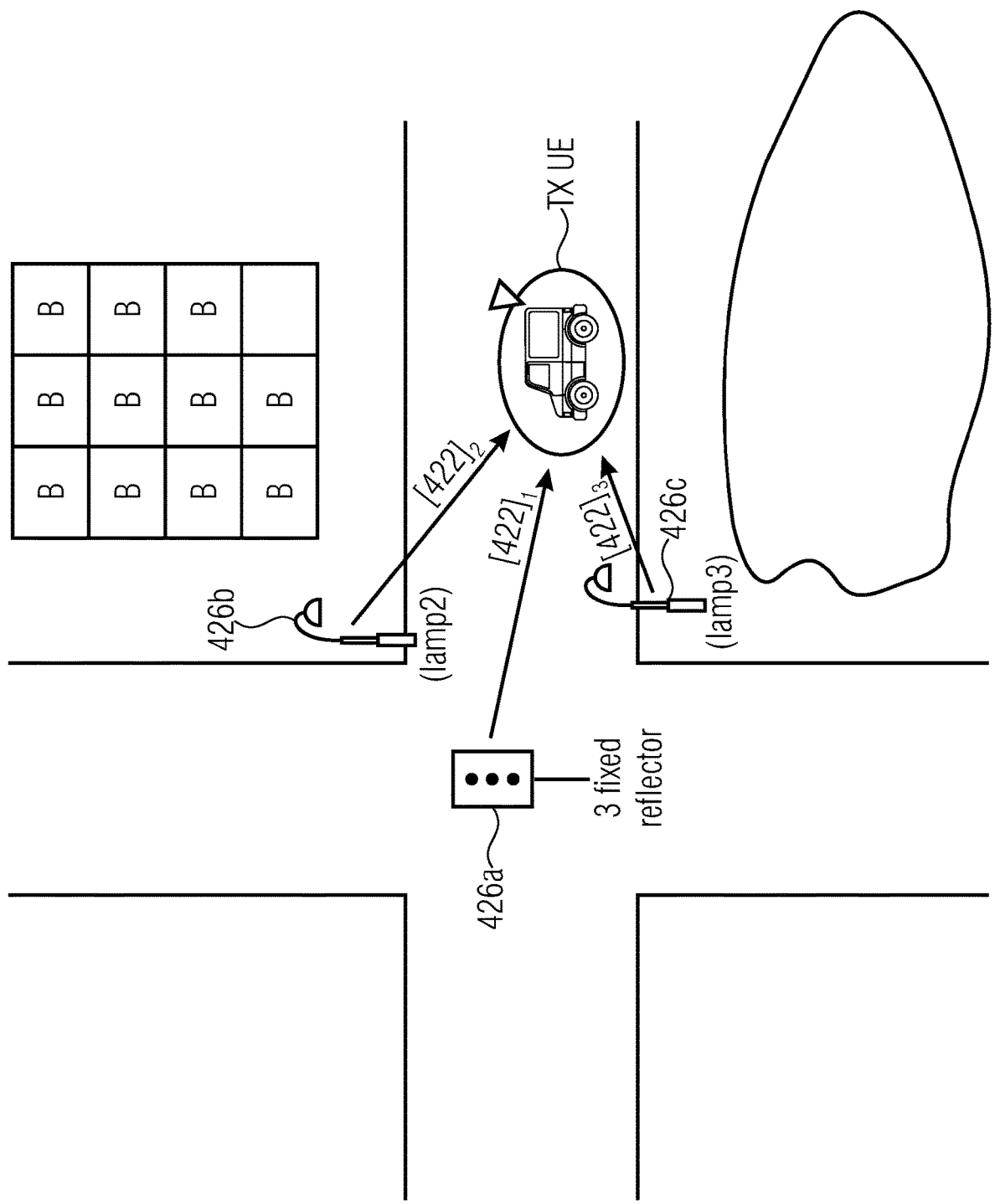
FIG. 10 illustrates an embodiment of improving the determination of a location of a transmitting UE using triangulation.
Figure 11:
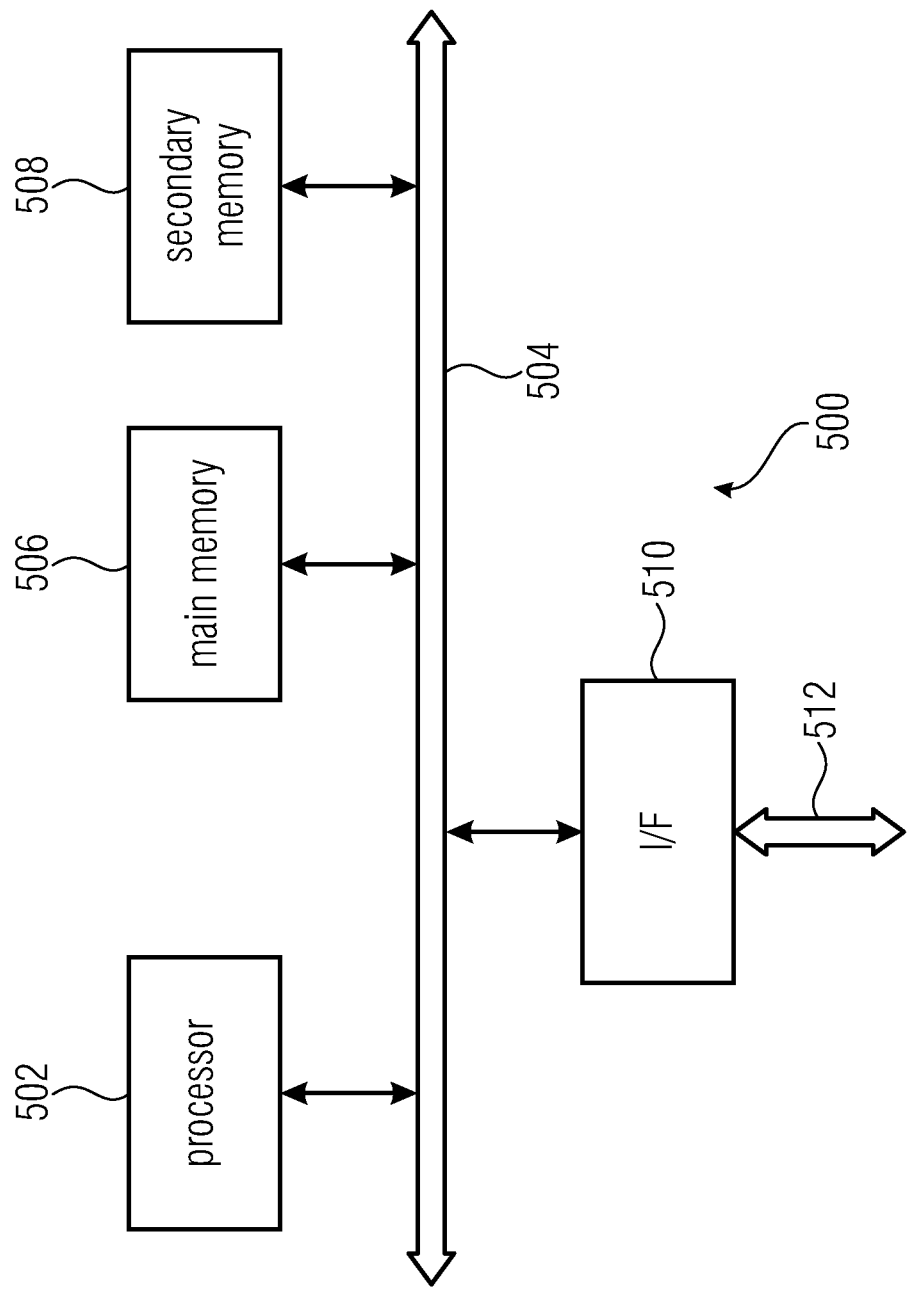
FIG. 11 illustrates an example of a computer system on which units or modules as well as the steps of the methods described in accordance with the inventive approach may execute.

In accordance with further embodiments, the accuracy of the determination of the minimum required communication range may be further enhanced by more accurately determining the location of a transmitting UE. In accordance with embodiments, the location of the transmitting UE may be determined by a triangulation on the basis of signals transmitted from one or more stationary network entities in the vicinity of the transmitting UE, for example from a roadside unit or a base station or from any static UE location. In accordance with embodiments, it is advantageous that for the triangulation no other moving receiving UEs are within the communication range. FIG. 10 illustrates an embodiment of improving the determination of a location of a transmitting UE using triangulation. The transmitting Tx UE, in the example of FIG. 10, is assumed to be a vehicular UE close to an intersection of two streets at which respective roadside units 426a to 426c are located which, in a similar way as described with reference to FIG. 9, responsive from a request to Tx UE respond with a response including the time offset and, optionally, the GPS coordinates. The first roadside unit 426a may be a traffic light provided at an elevated location at the center of the intersection, while the other two roadside units 426b, 426c may be respective street lamps.

Based on the information from the roadside units 426a to 426c the Tx UE may calculate its location by triangulation and, based on this more accurate location also the distance to the receiving UEs may be determined more accurately thereby enhancing the accuracy with which it may be determined whether a certain UE is within or outside a minimum required communication range.

In accordance with yet further embodiments, the minimum required communication range may be associated with the use of a feedback mechanism during the communication. As there may be many UEs around the transmitting UE which are not part of a groupcast or of a unicast communication, it is desired to reduce or limit the number of receiving UEs that are expected or allowed to send a feedback to the transmitting UE. Limiting the number of receiving UEs allowed to send a feedback is advantageous as it increases the reliability as the retransmission is directed to the correct one of the receiving UEs or to the correct group of receiving UEs. Another advantage of limiting the number of receiving UEs allowed to send feedback is that this limits the number of retransmission requests at the transmitting UE which may improve the network performance and avoid congestions.

The following embodiments concerning the feedback mechanism may be used together with the above-described embodiments concerning the desired QoS to be achieved, or may be used independent therefrom. For example, to increase the reliability of a communication, a feedback mechanism, like a HARQ feedback may be used at least for groupcast and unicast communications in V2X communications. To avoid signaling overhead, it is desired to identify and limit the number of receiving UEs that may send feedback to the transmitting UE. The limiting of the number of receiving UEs that may send back a feedback to the transmitting UE may be based on the above-described minimum required communication range. In accordance with embodiments one of the pre-configured, semi-flexible or flexible communication ranges may be employed and dependent on whether a UE is within the range or outside the range, it is identified whether such a UE is to send a feedback or not. UEs making use of the flexible communication range approach described above in more detail may set up thresholds responsive to which the feedback is triggered, and the thresholds may be pre-configured or may be set up by the network. For example, in case a threshold for the feedback is exceeded, like an RSRP measurement for certain group members or a unicast member, the feedback may be initiated.

In order to find out the UEs which may send feedback and which may not send feedback, an accurate distance between the transmitting UE and the receiving UEs is to be calculated, and dependent on the distance, it may be judged whether the UE is actually within the pre-configured minimum required communication range, the semi-flexible communication range or the flexible communication range which have been described in detail above.

For example, when it is determined that a UE is outside the minimum required communication range the feedback mechanism may be deactivated or not initialized, i.e., the UE is not to send any retransmission requests (in case the UE is a receiving UE), or any retransmissions (in case the UE is a transmitting UE). On the other hand, for a predefined groupcast and/or dynamic groupcast and/or unicast communication on a sidelink to one or more UEs that are within the communication range, the receiving UEs are allowed to send feedback, for example a HARQ feedback, so as to increase the reliability of the transmission. The transmitting UE may use a flexible communication range approach as described above and may set up thresholds that may be pre-configured or defined by the network, for triggering the feedback transmissions. If the threshold for the feedback is exceeded, for example if the RSRPs of the UEs of a certain group or a unicast UE is exceeded, a feedback is activated or initiated. In accordance with embodiments, the feedback may be explicitly signaled in a control channel or may be implicitly derived based on the range calculations as described above. More specifically, a transmitting UE may determine certain UEs that are within the minimum required communication range and may signal, using for example the sidelink control channel, to those UEs that they are to activate their feedback mechanism so as to send ACK/NACK in response to a transmission so as to allow the transmitting UE to make a retransmissions within a useful time frame, i.e., within a timeframe during which the retransmission may be processed by the receiving UE while still providing, for example, sufficient time for the vehicular UE to react to the fully decoded message, like an emergency message to avoid, for example, a crash situation. In case of a receiving UE, instead of receiving the activation explicitly via the control channel, the receiving UE may also determine a communication range and only provide feedback automatically to those transmitting UEs that are within the minimum communication range.

General

Embodiments of the present invention have been described in detail above, and the respective embodiments and aspects may be implemented individually or two or more of the embodiments may be implemented in combination. It is noted that a UE may have multiple destination L2 IDs and/or multiple source L2 IDs depending on different transmission/receptions, e.g. unicast, groupcast and multicast.

Embodiments of the present invention have been described in detail above with reference to a sidelink communication using the PC5 interface. However, the present invention is not limited to the use of the PC5 interface. Any other interface allowing for a direct communication among one or more UEs may be employed, e.g., interfaces according to the IEEE 802.11p standard, the IEEE 802.15.4 standard (Zigbee), and others.

In some of the embodiments described above, reference has been made to respective vehicles being either in a mode in which SL resource allocation configuration or assistance is provided by a base station, e.g., the connected mode, also referred to as NR mode 1 or LTE mode 3 configuration, or vehicles being in a mode in which when no SL resource allocation configuration or assistance is provided by a base station, e.g., the idle mode, also referred to as NR mode 2 or LTE mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also, in such scenarios, the inventive aspects described above may be employed.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 10 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ACRONYMS AND SYMBOLS

| | |
|---|---|
| V2X | Vehicle-to-Everything |
| 3GPP | Third Generation Partnership Project |
| D2D | Device-to-Device |
| ITS | Intelligent Transport Services |
| FR1, FR2 | Frequency Range Designations |
| BS | Base Station |
| eNB | Evolved Node B (3G base station) |
| UE | User Equipment |
| SL | Sidelink |
| V2V | Vehicle-to-Vehicle |
| SCS | Sub Carrier Spacing |
| RB | Resource Block |
| PSCCH | Physical Sidelink Control Channel |
| PSSCH | Physical Sidelink Shared Channel |
| TTI | Transmit Time Interval |
| SCI | Sidelink Control Information |
| DCI | Downlink Control Information |
| CP | Cyclic Prefix |
| BWP | Bandwidth Part |
| CORESET | Control Resource Set |
| USS | UE-Specific Search Space |
| CSS | Common Search Space |
| RP | Resource Pool |
| mRP | Mini Resource Pool |
| NR | New Radio |
| SLR | Service Level Requirements |
| CAM | Cooperative Awareness messages |
| PSSCH | Physical Sidelink Shared Channel |
| PSCCH | Physical Sidelink Control Channel |
| SCI | Sidelink Control Information |
| DENM | Decentralized Network messages |
| TPC | Transmit-power control |
| DMRS | Demodulation Reference Signals |
| S-RSRP | Sidelink-Received Signal Strength |
| QoS | Quality of Service |
| MCS | Modulation Coding Scheme |
| TBS | Transport Block Size |

What is claimed is:

1. A user device, UE, for a wireless communication system, wherein
    the UE is configured to be connected to at least one further UE via a sidelink for a sidelink communication with the further UE,
    for transmitting to the further UE via the sidelink, the UE is configured to
        acquire distance information representing a certain communication range or a certain distance around the UE, and
        initiate a feedback mechanism for the sidelink communication when the further UE is at or within the certain communication range or the certain distance, and
        not initiate the feedback mechanism for the sidelink communication when the further UE is outside the certain communication range or the certain distance,
    the UE determines whether the further UE is within the minimum required communication range,
    when determining the further UE to be within the minimum required communication range, the UE explicitly signals to the further UE to activate the feedback mechanism of the further UE,
    the feedback mechanism of the further UE is activated in the further UE in response to the UE signaling, and
    the further UE sends the feedback in response to a sidelink transmission by the UE.

2. The user device, UE, according to claim 1, wherein the UE is to explicitly signal an activation of the feedback mechanism via a control channel to the further UE.

3. The user device, UE, claim 1, wherein the UE comprises one or more of a mobile terminal, or a stationary terminal, or a cellular IoT-UE, or a vehicular UE, or an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network.

4. A wireless communication system comprising:
    one or more base stations, and
    a plurality of user devices, UEs, the plurality of UEs comprising
    a UE configured to be connected to at least one further UE via a sidelink for a sidelink communication with the further UE,
    wherein, for transmitting to the further UE via the sidelink, the UE is configured to
        acquire distance information representing a certain communication range or a certain distance around the UE, and
        initiate a feedback mechanism for the sidelink communication when the further UE is at or within the certain communication range or the certain distance, and
        not initiate the feedback mechanism for the sidelink communication when the further UE is outside the certain communication range or the certain distance,
    wherein the UE determines whether the further UE is within the minimum required communication range,
    wherein, when determining the further UE to be within the minimum required communication range, the UE explicitly signals to the further UE to activate the feedback mechanism of the further UE,
    wherein the feedback mechanism of the further UE is activated in the further UE in response to the UE signaling, and
    wherein the further UE sends the feedback in response to a sidelink transmission by the UE.

5. The wireless communication system of claim 4, wherein the base station comprises one or more of a macro cell base station, or a small cell base station, or a central unit of a base station, or a distributed unit of a base station, or a road side unit, or a UE, or a remote radio head, or an AMF, or an SMF, or a core network entity, or a network slice as in the NR or 5G core context, or any transmission/reception point, TRP, enabling an item or a device to communicate using the wireless communication network, the item or device being provided with network connectivity to communicate using the wireless communication network.

6. A method for operating a user device, UE, for a wireless communication system, wherein the UE is connected to at least one further UE via a sidelink for a sidelink communication with the further UE, wherein, for transmitting to the further UE via the sidelink, the method comprises:

acquiring distance information representing a certain communication range or a certain distance around the UE, and initiating a feedback mechanism for the sidelink communication when the further UE is at or within the certain communication range or the certain distance not initiating the feedback mechanism for the sidelink communication when the further UE is outside the certain communication range or the certain distance, and wherein the UE determines whether the further UE is within the minimum required communication range, wherein, when determining the further UE to be within the minimum required communication range, the UE explicitly signals to the further UE to activate the feedback mechanism of the further UE, wherein the feedback mechanism of the further UE is activated in the further UE in response to the UE signaling, and wherein the further UE sends the feedback in response to a transmission by the UE.

7. The method according to claim 6, comprising explicitly signaling an activation of the feedback mechanism via a control channel to the further UE.

8. A non-transitory digital storage medium having a computer program stored thereon to perform, when said computer program is run by a computer, the method for operating a user device, UE, for a wireless communication system, wherein the UE is connected to at least one further UE via a sidelink for a sidelink communication with the further UE, wherein, for transmitting to the further UE via the sidelink, the method comprises:

acquiring distance information representing a certain communication range or a certain distance around the UE, and initiating a feedback mechanism for the sidelink communication when the further UE is at or within the certain communication range or the certain distance, not initiating the feedback mechanism for the sidelink communication when the further UE is outside the certain communication range or the certain distance, and wherein the UE determines whether the further UE is within the minimum required communication range, wherein, when determining the further UE to be within the minimum required communication range, the UE explicitly signals to the further UE to activate the feedback mechanism of the further UE, wherein the feedback mechanism of the further UE is activated in the further UE in response to the UE signaling, and wherein the further UE sends the feedback in response to a transmission by the UE.

* * * * *